United States Patent
Jensen

(10) Patent No.: US 11,904,659 B2
(45) Date of Patent: Feb. 20, 2024

(54) MOBILE LEISURE ACCOMMODATION VEHICLE AND A METHOD FOR VENTILATING A MOBILE LEISURE ACCOMMODATION VEHICLE

(71) Applicant: Dometic Sweden AB, Solna (SE)

(72) Inventor: John Børsting Jensen, Struer (DK)

(73) Assignee: Dometic Sweden AB, Solna (SE)

( * ) Notice: Subject to any disclaimer, the term of this patent is extended or adjusted under 35 U.S.C. 154(b) by 93 days.

(21) Appl. No.: 16/492,440

(22) PCT Filed: Mar. 8, 2018

(86) PCT No.: PCT/DK2018/050043
§ 371 (c)(1),
(2) Date: Sep. 9, 2019

(87) PCT Pub. No.: WO2018/162016
PCT Pub. Date: Sep. 13, 2018

(65) Prior Publication Data
US 2020/0039325 A1  Feb. 6, 2020

(30) Foreign Application Priority Data
Mar. 9, 2017 (DK) .......................... PA 2017 70171

(51) Int. Cl.
*B60H 1/26* (2006.01)
*B60H 1/00* (2006.01)
(52) U.S. Cl.
CPC ......... *B60H 1/262* (2013.01); *B60H 1/00021* (2013.01); *B60H 1/00828* (2013.01); *B60H 2001/00178* (2013.01)

(58) Field of Classification Search
CPC ...... B60H 1/00021; B60H 1/262; B60H 1/26; B60H 1/008; B60H 1/00978;
(Continued)

(56) References Cited

U.S. PATENT DOCUMENTS 1,846,552 A * 2/1932 Haskins ................. B60H 1/247
454/138
2,165,580 A * 7/1939 Scheufler ........... B61D 27/0081
74/13
(Continued)

FOREIGN PATENT DOCUMENTS

AU 2004202967 6/2005
AU 2007237183 6/2008
(Continued)

OTHER PUBLICATIONS

The 3 Rules of Air Leakage (Plus a Bonus!)—Energy Vanguard (May 2012) (Year: 2012).*
(Continued)

*Primary Examiner* — Jenna M Hopkins
(74) *Attorney, Agent, or Firm* — Dinsmore & Shohl LLP

(57) ABSTRACT

A mobile accommodation vehicle having a first free flow opening enabling free air flow between the inside and the outside of the vehicle and a second free flow opening also enabling free air flow between the inside and the outside of the vehicle. The first free flow opening is arranged higher than the second free flow opening in the vehicle. The first free flow opening or the second free flow opening is provided with heat recovery ventilation means which is arranged to enable free air flow through the heat recovery ventilation means, when the heat recovery ventilation means is not in operation.

12 Claims, 5 Drawing Sheets

Figure 1:
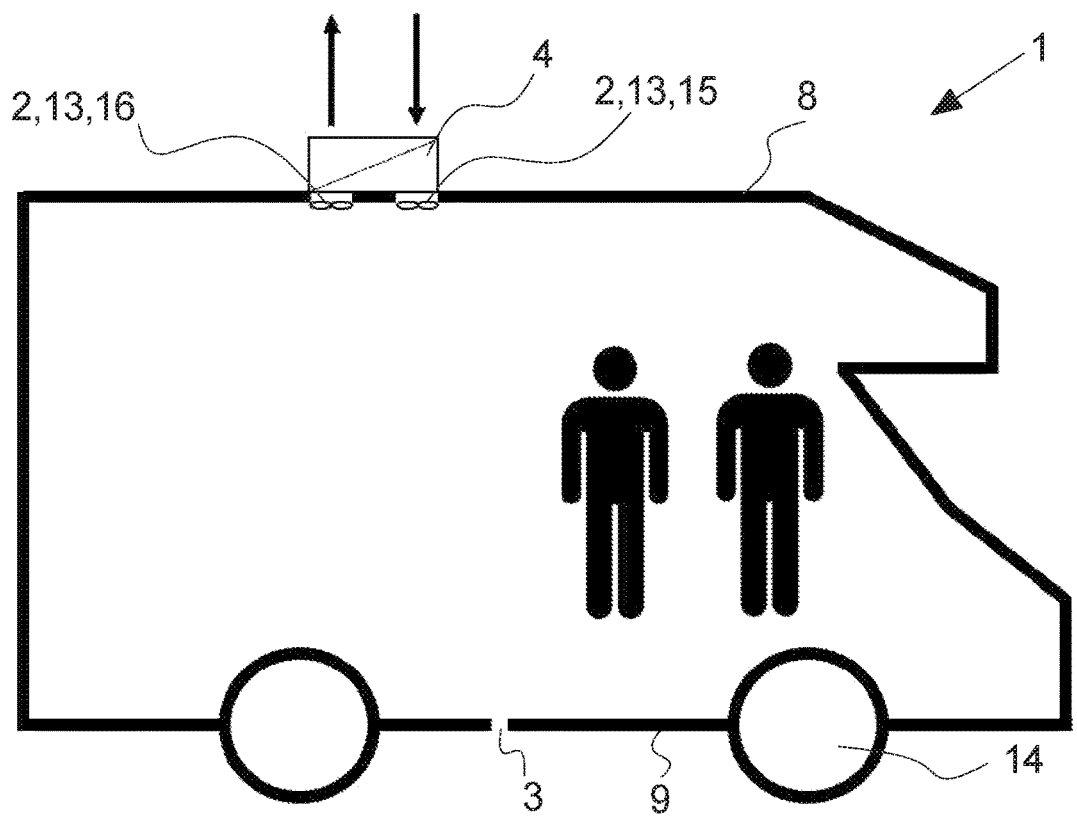

(58) Field of Classification Search
CPC ...... B60H 1/00364; B60H 2001/00221; B60H 1/248; B60H 2003/0683; B60H 1/00821; B60H 1/00828; F24F 7/84; F24F 2011/0002; F24F 2211/12; F24F 2211/125; F24F 11/32–35; F24F 11/74; F24F 2110/70
See application file for complete search history.

(56) References Cited

U.S. PATENT DOCUMENTS

| | | | |
|---|---|---|---|
| 2,332,034 A * | 10/1943 | West | B61D 27/0081 454/103 |
| 2,610,567 A * | 9/1952 | Davis | B60H 1/00014 454/103 |
| 3,727,537 A | 4/1973 | Harty | |
| 3,738,621 A * | 6/1973 | Anderson | B60P 3/36 261/106 |
| 3,807,290 A * | 4/1974 | Eubank | F24F 7/06 454/105 |
| 3,962,885 A * | 6/1976 | Schoenbachler | F24F 13/32 296/156 |
| 3,964,271 A * | 6/1976 | Schulze, Sr. | F24F 13/32 62/448 |
| 3,964,272 A * | 6/1976 | Raleigh | F24F 13/32 62/448 |
| 3,996,762 A * | 12/1976 | Calme | F25D 19/00 62/448 |
| 4,048,910 A * | 9/1977 | Weir | B60H 1/00378 62/263 |
| 4,530,804 A * | 7/1985 | Cates | F28C 1/04 261/DIG. 11 |
| 4,633,767 A * | 1/1987 | Sain | B60L 8/003 62/235.1 |
| 4,989,499 A * | 2/1991 | Scoccia | B60H 1/00821 454/70 |
| 5,024,263 A * | 6/1991 | Laine | F24F 13/15 165/283 |
| 5,205,782 A * | 4/1993 | Ohba | B60H 1/248 454/900 |
| 5,238,447 A * | 8/1993 | Weissbrich | B60H 1/00821 454/75 |
| D386,735 S | 11/1997 | Krueger | |
| 5,727,998 A | 3/1998 | Krueger | |
| 5,741,180 A * | 4/1998 | Xia | F24F 13/1413 454/355 |
| 6,016,710 A * | 1/2000 | Boles | F24F 3/1423 73/861.42 |
| 6,116,095 A * | 9/2000 | Radle | B60H 1/00364 73/756 |
| 6,496,110 B2 * | 12/2002 | Peterson | G06Q 10/06 340/506 |
| 6,581,544 B1 * | 6/2003 | Smith | B60P 3/04 62/412 |
| 6,857,953 B2 | 2/2005 | Malott | |
| 6,881,142 B1 * | 4/2005 | Nair | F24F 11/0001 454/252 |
| 6,945,071 B1 * | 9/2005 | Simeone | F25D 11/003 62/412 |
| 7,004,832 B2 * | 2/2006 | Thomas | B60H 1/00364 454/94 |
| 7,163,456 B2 * | 1/2007 | Miyata | B60H 1/00885 165/41 |
| 7,419,368 B2 | 9/2008 | Milks | |
| 7,731,249 B2 | 6/2010 | Milks | |
| 7,731,574 B2 | 6/2010 | Milks | |
| D672,450 S | 12/2012 | Milks | |
| 8,535,127 B2 | 9/2013 | Malott | |
| 8,568,209 B2 * | 10/2013 | Boxum | B60H 1/247 454/137 |
| 9,090,145 B2 * | 7/2015 | Baker | B60H 1/00821 |
| D762,528 S | 8/2016 | Allard | |
| 9,557,072 B2 | 1/2017 | Tonlinski | |
| D782,939 S | 4/2017 | Allard | |
| D782,940 S | 4/2017 | Allard | |
| D782,941 S | 4/2017 | Allard | |
| 9,630,472 B2 * | 4/2017 | Francois | B60H 1/00014 |
| 9,631,832 B2 | 4/2017 | Malott | |
| 9,636,970 B2 * | 5/2017 | Jange | G01F 15/002 |
| 9,841,208 B2 * | 12/2017 | Salerno | F24F 11/77 |
| 9,844,996 B2 * | 12/2017 | Parry | B60H 1/00828 |
| 9,975,405 B2 * | 5/2018 | Siddiqui | B60H 1/3407 |
| 10,093,152 B2 * | 10/2018 | Allard | B60H 1/00364 |
| D850,609 S | 6/2019 | Bergin | |
| 10,538,145 B2 * | 1/2020 | Shingu | B60H 1/00907 |
| 10,631,517 B2 * | 4/2020 | Kim | B60H 1/245 |
| D884,870 S | 5/2020 | Bergin | |
| 10,683,038 B2 | 6/2020 | Fleckenstein | |
| 10,933,713 B2 * | 3/2021 | Ferri | B60H 1/00378 |
| D915,569 S | 4/2021 | Meda | |
| D917,036 S | 4/2021 | Hederstierna | |
| 11,027,595 B2 * | 6/2021 | Smith | B60H 1/262 |
| 11,066,084 B2 * | 7/2021 | Onitake | F24F 13/02 |
| 2002/0088655 A1 * | 7/2002 | Falk | B60K 13/02 180/68.3 |
| 2003/0159802 A1 * | 8/2003 | Steneby | F24F 12/006 165/59 |
| 2006/0052050 A1 | 3/2006 | Malott | |
| 2006/0103154 A1 * | 5/2006 | Berry | B60P 3/32 296/24.39 |
| 2008/0220710 A1 * | 9/2008 | Nonnenmacher | B60H 1/00828 454/75 |
| 2010/0011495 A1 | 1/2010 | Neubauer | |
| 2011/0105005 A1 * | 5/2011 | Spaggiari | B60H 1/00828 454/75 |
| 2012/0083196 A1 * | 4/2012 | Mockridge | F24F 11/0001 454/239 |
| 2014/0262132 A1 * | 9/2014 | Connell | B60H 1/00457 165/96 |
| 2015/0344044 A1 * | 12/2015 | Yuasa | B60H 1/00371 454/103 |
| 2016/0103111 A1 * | 4/2016 | Griffin | B60N 2/002 73/25.01 |
| 2017/0036512 A1 * | 2/2017 | Willard, Jr. | B60H 1/00892 |
| 2018/0147514 A1 * | 5/2018 | Harke | B60H 1/039 |
| 2018/0178619 A1 * | 6/2018 | Guitart Corominas | B60H 1/00735 |
| 2019/0061829 A1 | 2/2019 | Fleckenstein | |
| 2019/0315197 A1 | 10/2019 | Williamson | |
| 2020/0031204 A1 * | 1/2020 | Keller | B60H 3/0658 |
| 2020/0039325 A1 * | 2/2020 | Jensen | B60H 1/248 |
| 2020/0215879 A1 | 7/2020 | Chevalier | |
| 2020/0376993 A1 | 12/2020 | Bilston | |
| 2022/0009306 A1 | 1/2022 | Hornung | |

FOREIGN PATENT DOCUMENTS

| | | | |
|---|---|---|---|
| AU | 2012261549 | 1/2013 | |
| AU | 359396 S | 12/2014 | |
| AU | 359397 S | 12/2014 | |
| AU | 201712794 S | 5/2017 | |
| AU | 201712798 S | 5/2017 | |
| AU | 2018232195 | 10/2019 | |
| AU | 2019202512 | 10/2019 | |
| AU | 201916406 S | 12/2019 | |
| AU | 201916408 S | 12/2019 | |
| AU | 201916409 S | 12/2019 | |
| AU | 202016120 S | 1/2021 | |
| AU | 202016121 S | 1/2021 | |
| AU | 202016122 S | 1/2021 | |
| AU | 202016123 S | 1/2021 | |
| CA | 2205496 C * | 12/2005 | B60P 3/32 |
| CA | 2518348 | 3/2006 | |
| CA | 2611822 | 5/2008 | |
| CA | 2792083 A1 * | 4/2014 | F24F 11/0079 |
| CA | 2906348 | 9/2014 | |
| CA | 2951956 | 12/2015 | |
| CA | 159763 | 4/2016 | |
| CA | 166627 | 4/2016 | |
| CA | 167431 S | 2/2017 | |
| CA | 172872 S | 2/2017 | |

(56) References Cited

FOREIGN PATENT DOCUMENTS

| | | | | |
|---|---|---|---|---|
| CA | 172873 | S | 2/2017 | |
| CA | 172874 | S | 2/2017 | |
| CA | 3055636 | | 9/2018 | |
| CN | 303533883 | S | 12/2015 | |
| CN | 105492227 | A | 4/2016 | |
| CN | 110520314 | | 11/2019 | |
| DE | 3911196 | | 11/1989 | |
| DE | 4333173 | A1 * | 3/1995 | .......... F24F 11/0001 |
| DE | 20114027 | | 1/2002 | |
| DE | 20313136 | U1 | 11/2003 | |
| DE | 202005013530 | | 12/2005 | |
| DE | 602004004480 | | 3/2007 | |
| DE | 102007008792 | | 9/2008 | |
| DE | 602005012194 | | 2/2009 | |
| DE | 102007056770 | A1 * | 6/2009 | ......... B60H 1/00778 |
| DE | 102017214863 | | 10/2018 | |
| DE | 102019205194 | | 10/2019 | |
| DE | 102019200066 | | 7/2020 | |
| DK | 201770171 | | 11/2018 | |
| EP | 1538009 | | 6/2005 | |
| EP | 1623858 | A2 * | 2/2006 | ........... B60H 1/0005 |
| EP | 1634740 | | 3/2006 | |
| EP | 1925889 | | 5/2008 | |
| EP | 2121385 | | 11/2009 | |
| EP | 2199699 | A2 | 6/2010 | |
| EP | 2660085 | A1 * | 11/2013 | ......... B60H 1/00378 |
| EP | 2905158 | A1 | 8/2015 | |
| EP | 3592585 | B1 | 5/2021 | |
| EP | 3895921 | A1 * | 10/2021 | |
| FR | 2737687 | A1 * | 2/1997 | ............. B60H 1/246 |
| GB | 2518941 | A | 4/2015 | |
| RU | 1483807 | A1 | 11/1996 | |
| RU | 19795 | U1 | 10/2001 | |
| RU | 2753994 | C2 | 8/2021 | |
| WO | 2008101730 | | 8/2008 | |
| WO | WO-2012025122 | A1 * | 3/2012 | .......... F24F 11/0001 |
| WO | 2014143181 | | 9/2014 | |
| WO | 2017149442 | | 9/2017 | |
| WO | 2018162016 | | 9/2018 | |

OTHER PUBLICATIONS

International Search Report and Written Opinion for PCT/DK2018/050043, dated Mar. 8, 2018, 10 pages.
Russian Decision to Grant, dated Jun. 21, 2021, 11 pages.
New Zealand Patent Application No. 757123 titled "A mobile leisure accommodation vehicle and a method for ventilating a mobile leisure accommodation vehicle" filed on Mar. 8, 2018.
European Patent Office, Decision to Grant in app. No. EP3592585 dated Apr. 30, 2021.
Dometic 2016 Product Catalog, Vents (2016).
Design U.S. Appl. No. 29/774,535, filed Mar. 17, 2021 titled Air Distribution Box.
Design U.S. Appl. No. 29/715,592, filed Dec. 3, 2019 titled Filter Housing.
Office Action for China Patent Application No. 201880016396.5 dated Jul. 14, 2022.
Decision of Rejection issued for China Patent Application No. 201880016396.5 dated Feb. 5, 2023.
Examination Report No. 1 issued in Au Patent Application No. 2018232195 dated May 2, 2023.

* cited by examiner

MOBILE LEISURE ACCOMMODATION VEHICLE AND A METHOD FOR VENTILATING A MOBILE LEISURE ACCOMMODATION VEHICLE

RELATED APPLICATIONS

This application is a national phase of PCT/DK2018/050043, filed on Mar. 8, 2018, which claims the benefit of Danish Patent Application No. PA 2017 70171 filed on Mar. 9, 2017. The entire contents of these applications are hereby incorporated by reference.

BACKGROUND OF THE INVENTION

The invention relates to a mobile accommodation vehicle comprising a first free flow opening enabling free airflow between the inside and the outside of the vehicle and a second free flow opening also enabling free airflow between the inside and the outside of the vehicle, wherein the first free flow opening is arranged higher than the second free flow opening in the accommodation vehicle.

The invention further relates to a method for ventilating a mobile accommodation vehicle.

DESCRIPTION OF THE RELATED ART

In many countries it is a legal requirement that mobile leisure accommodation vehicles—such as RVs, caravans, mobile homes and other—are provided with at least two free flow ventilation holes to provide an unhindered supply of fresh air inside the mobile accommodation vehicle at all times to thereby ensure that the CO2 level inside the mobile accommodation vehicle remains at an acceptable level even if many people are present inside the mobile accommodation vehicle or if an open flame is present inside the vehicle e.g. in the form of an open flame heater or a gas stove.

Different countries have different legal requirement but in most cases, it is a requirement that a large hole of a certain size is formed in or at the roof of the vehicle and a smaller hole of a certain size is formed in or at the floor of the vehicle, so that fresh air may flow in through one of the holes and out through the other—depending on if the inside of the mobile accommodation vehicle is hotter or colder than the outside of the mobile accommodation vehicle.

However, in the summertime the mobile accommodation vehicle is often air conditioned to ensure a comfortable low temperature level inside the vehicle and in the wintertime, it is heated to ensure a comfortable high temperature level inside the vehicle. This temperature difference between the inside and the outside of the vehicle will through convection aid in creating a significant air flow through the mentioned holes and it therefore can require a lot of energy to maintain a desired temperature level inside vehicle.

An object of the invention is therefore to provide for advantageous technique for ventilating a mobile accommodation vehicle.

THE INVENTION

The invention provides for a mobile accommodation vehicle comprising a first free flow opening enabling free airflow between the inside and the outside of the vehicle and a second free flow opening also enabling free airflow between the inside and the outside of the vehicle, wherein the first free flow opening is arranged higher than the second free flow opening in the accommodation vehicle. The first free flow opening or the second free flow opening is provided with heat recovery ventilation means and the heat recovery ventilation means is arranged to enable free air flow through the heat recovery ventilation means, when the heat recovery ventilation means is not in operation or the heat recovery ventilation means is provided in a third free flow opening if passage through the heat recovery ventilation means is blocked or at least substantially reduced when the heat recovery ventilation means is not in operation.

Providing one of the free flow openings with the heat recovery ventilation means is advantageous in that it allows for energy conservation by transferring energy from outgoing to incoming air or vice versa. This will reduce cost and save energy for heating the vehicle during cold periods or cooling the vehicle during warm periods.

But if the heat recovery ventilation means for some reason is not in operation it is advantageous that a free flow of air can be established through the heat recovery ventilation means or that the vehicle is provided in a third free flow opening so that an air flow between two different openings can be established at all times no matter if the heat recovery ventilation means is in operation or not.

Furthermore, the legal requirements to the free flow opening often enables a large air flow which can be quite unpleasant to the users of the vehicle (particularly if it is cold outside) and by arranging heat recovery ventilation means in at least one of the free air flow openings, a more pleasant indoor environment can be established.

It should be emphasised that by the term "heat recovery ventilation means" is to be understood any kind of heat recovery ventilator capable of actively generating an air flow by means of an air flow generator—such as a waving or rotating fan—which at the same time comprises heat recovery means—such as a regenerator, a recuperator, a heat exchanger or other devices (also known as air exchanger, an air-to-air heat exchanger or other)—or any other kind of heat recovery device, which e.g. employs a cross flow or counter-flow to exchange heat (countercurrent heat exchange) between the inbound and outbound air flow through the heat recovery ventilation means. I.e. the heat recovery ventilation means can comprise any kind of heat transfer system capable of actively moving energy between inflow air and outflow air e.g. by means of water or another media or it could comprise any other heat transfer system or arrangement suitable for transferring heat between different air flows (e.g. a heat pump).

It should also be emphasised that by the term "mobile accommodation vehicle" is to be understood any kind of caravan, mobile home, trailer, recreational vehicle, auto-camper or similar devices suitable for accommodating a smaller number of people—usually maximum six persons—(e.g. during a holiday) [and being small and compact so that the vehicle is mobile]. The mobility is typically also enabled in that the vehicle rests on wheels (or caterpillar tracks, runners or other). In some embodiments, the mobile accommodation vehicle is designed to be propelled by another vehicle and in some embodiments, the mobile accommodation vehicle could be self-propelled.

It should further be emphasised that by the term "free flow opening" is to understood an opening between the inside and the outside of the vehicle through which air may flow freely and un-driven.

In an aspect of the invention, the mobile accommodation vehicle comprises control means arranged to generate a balanced air flow through the heat recovery ventilation means enabling that when the heat recovery ventilation means is in operation, the inflow through the heat recovery ventilation means will be substantially equal to the outflow through the heat recovery ventilation means.

If the vehicle only comprises two free flow openings and the heat recovery ventilation means is arranged in one of them, it is advantageous to balance air flow through the heat recovery ventilation means in that the air flow through the other free flow opening hereby is reduced.

In this context, the term "control means" should be understood as any kind of controller capable of controlling the operation of at least parts of the heat recovery ventilation means—i.e. any kind of logic circuit, Programmable Logic Controller (PLC), computer or other.

In an aspect of the invention, the mobile accommodation vehicle comprises air flow measuring means for measuring an inflow and an outflow through at least one of the first free flow opening, the second free flow opening or the third free flow opening and/or pressure differential measuring means for measuring a pressure differential between the inside and of outside of the mobile accommodation vehicle.

Providing the vehicle with air flow measuring means and/or pressure differential measuring means is advantageous in that such means enables that the heat recovery ventilation means can be controlled to operate more efficiently.

In this context the term "air flow measuring means" should be understood as any kind of air flow measuring sensor capable of measuring an air flow through at least one of the free flow openings or at the heat recovery ventilation means—i.e. any kind of Laser Doppler anemometer, hot wire meter, hot film meters, Ultrasonic anemometer or other devices capable of more or less directly measuring the air flow or it could be any kind of device capable of deducting the air flow on the basis of e.g. pressure differential across an opening, static versus dynamic pressure, cooling level of a heated element, heat transfer differences, ventilator loading, Vortex patterns, Coriolis effect, rotating anemometer speed, acoustic echoes, heat capacity ratios, temperature change rates or other known air flow measurement method.

Also, in this context the term "pressure differential measuring means" should be understood as any kind of pressure differential sensor capable of measuring the pressure differential between the inside and of outside of the mobile accommodation vehicle at a free flow opening or at the heat recovery ventilation means at substantially the same height—i.e. any kind of pressure sensor, manometer, Aneroid gauges, air flow measurement over flow restriction or other.

In an aspect of the invention, the heat recovery ventilation means is arranged in the first free flow opening.

Arranging the heat recovery ventilation means in the highest free flow opening is advantageous in that the "polluted" hot air will rise upwards and because it provides better comfort inside the vehicle if the air inflow is established at the vehicle roof.

In an aspect of the invention, the heat recovery ventilation means is arranged in the second free flow opening.

The lower free flow opening is usually substantially smaller than the upper opening and it is therefore advantageous to fit the heat recovery ventilation means in the second free flow opening in that the heat recovery ventilation means hereby can be formed smaller and less costly.

In an aspect of the invention, the heat recovery ventilation means is arranged in both the first free flow opening and the second free flow opening.

Arranging heat recovery ventilation means in both the free flow openings is advantageous in that it allows for synchronous operation of the two heat recovery ventilation means so that when one is creating an inflow the other is creating an outflow, thus enabling that pressure, temperature, air flow and other may be better controlled.

In an aspect of the invention, the first free flow opening is arranged in a roof surface of the mobile accommodation vehicle and/or wherein the second free flow opening is arranged in a floor surface of the mobile accommodation vehicle.

Arranging the first free flow opening substantially as high as possible in the mobile accommodation vehicle and the second free flow opening substantially as low as possible in the mobile accommodation vehicle is advantageous in that a stronger and more efficient air flow can hereby be formed through the vehicle.

In an aspect of the invention, the heat recovery ventilation means comprises an emergency air flow device arranged to enable free flow through an emergency free flow opening if the heat recovery ventilation means is malfunctioning or out of operation.

Blocking the emergency free flow opening when the heat recovery ventilation means is operating as intended, is advantageous in that a more efficient heat recovery hereby can be established. However, if the heat recovery ventilation means does not operate as intended, it is advantageous that the emergency air flow device will actively enable free flow through the emergency free flow opening so that an air flow may be established between a free flow opening and the emergency free flow opening. The emergency air flow device will be designed to be substantially fail-safe so that a free air flow may always be established through the emergency free flow opening if the heat recovery ventilation means is malfunctioning or out of operation.

It should be emphasised that by the term "emergency air flow device" is to be understood any kind of actuatable air flow blocking device capable of optionally blocking an air flow through an opening—such as any kind of valve, air strangler, throttle, register, gate, slide, damper, air-flow-counteracting ventilator or any other.

In an aspect of the invention, the mobile accommodation vehicle rests on wheels of the mobile accommodation vehicle.

Hereby is achieved an advantageous embodiment of the invention.

In an aspect of the invention, the mobile accommodation vehicle comprises control means arranged to control the operation of the heat recovery ventilation means so that the pressure inside the mobile accommodation vehicle is substantially equal to the pressure outside the mobile accommodation vehicle.

Controlling the heat recovery ventilation means so that the air pressure inside the vehicle is substantially equal to the air pressure outside the vehicle—at a given height e.g. at a free flow opening or at the heat recovery ventilation means—is advantageous in that this will reduce air flow through free openings in the vehicle (ventilation openings or other opening) and thereby reduce energy loss and increase the effect of the heat recovery ventilation means.

In an aspect of the invention, the heat recovery ventilation means comprises a regenerator.

A regenerator is very effective as a temporary heat storage element and a regenerator is relatively inexpensive and simple to produce. Furthermore, a regenerator is relatively small and therefore requires a smaller opening in the vehicle structure.

The invention further provides for a method for ventilating a mobile accommodation vehicle comprising a first free flow opening capable of enabling free airflow between the inside and the outside of the accommodation vehicle and a second free flow opening also capable of enabling free airflow between the inside and the outside of the accommodation vehicle. The first free flow opening is arranged higher than the second free flow opening in the accommodation vehicle and the mobile accommodation vehicle further comprises heat recovery ventilation means, wherein the heat recovery ventilation means is controlled to reduce the free air flow through at least one of the first free flow opening or the second free flow opening.

Operating the heat recovery ventilation means so that air flow through at least one of the free flow openings is reduced is advantageous in that it will reduce energy loss and increase the effect of the heat recovery ventilation means.

In an aspect of the invention, the method further comprises the steps of:
  directly or indirectly obtaining measurements regarding the airflow in and/or out of the first free flow opening, the second free flow opening and/or the heat recovery ventilation means, and
  controlling an air flow out through the heat recovery ventilation means and/or an air flow in through the heat recovery ventilation means on the basis of the measurements.

Controlling the air flow through the heat recovery ventilation means on the basis of the measurements of air flow through a free flow opening and/or the heat recovery ventilation means is advantageous in that this will enable a better and more efficient control of the heat recovery ventilation means and/or better and more efficient control of the air flow through free flow openings.

In an embodiment, the heat recovery ventilation means could be controlled so that the internal pressure level is controlled with the purpose to control the air flow (e.g. leak flow) through other openings in the vehicle than the one in which the heat recovery ventilation means is located. As an example, the pressure inside the vehicle could be controlled to a level below the pressure outside the vehicle to avoid moisture build-ups around leaking spots when it is cold outside the vehicle. Another purpose of controlling the differential pressure is to deliberately use a passive free flow opening in the vehicle as a controlled ventilation opening, e.g. as a base level ventilation in a bathroom.

The predefined pressure level could be an absolute pressure level or the predefined pressure level, in relation to which the heat recovery ventilation means attempts to control the pressure in the vehicle, could also be defined as a given pressure difference between the inside and the outside of the vehicle, i.e. the inside pressure level is controlled relatively to the pressure outside the vehicle—e.g. with a predefined offset.

A predefined offset level could be static or it could vary dynamically in relation to time of day, time of year, the operational status of the vehicles air conditioning system, heater systems or in relation to a number of other factors.

In an aspect of the invention, the method further comprises the steps of:
  actively generating an air outflow out through the heat recovery ventilation means,
  using the outflow of air to cool or heat a heat exchange unit of the heat recovery ventilation means,
  actively generating an air inflow in through the heat recovery ventilation means,
  cooling or heating the inflow air by means of the heat exchange unit, and
  establish free airflow between the inside and the outside of the mobile accommodation vehicle through the heat recovery ventilation means if the heat recovery ventilation means is not actively generating an air flow, or
  establish a free air flow between the inside and the outside of the vehicle through a third free flow opening at least if passage through the heat recovery ventilation means is blocked or at least substantially reduced.

Hereby is achieved an advantageous embodiment of the invention.

In an aspect of the invention, the heat recovery ventilation means is controlled so that an inflow through the heat recovery ventilation means is substantially equal to an outflow through the heat recovery ventilation means.

Controlling the heat recovery ventilation means so that the inflow is substantially equal to the outflow is advantageous in that it reduces air flow through the free flow openings and thereby increases efficiency of the heat recovery ventilation means. Hereby a better heat recovery is achieved by the heat recovery ventilation means and if only one other free flow opening is present a reduction of the air flow through this opening is also achieved.

In an aspect of the invention, the heat recovery ventilation means is controlled so that the pressure inside the mobile accommodation vehicle is substantially equal to the pressure outside the mobile accommodation vehicle.

Controlling the heat recovery ventilation means so that the inside and the outside pressure, at a given height, at a given opening, is substantially maintained equal is advantageous in that energy loss hereby is more efficiently reduced.

In an aspect of the invention, the method further comprises monitoring the quality of the air inside the mobile accommodation vehicle and controlling the operation of the heat recovery ventilation means in response to the monitoring.

Further controlling the heat recovery ventilation means in relation to CO2 level, CO level, VOC level, temperature, air humidity or other is advantageous in that further functionality is hereby added to the heat recovery ventilation means, providing greater comport to the vehicle users. In another embodiment, the heat recovery ventilation means could also or instead be controlled in relation to energy consumption, comfort level or other.

In an aspect of the invention, the method is a method for ventilating a mobile accommodation vehicle according to any of previously mentioned vehicles.

FIGURES

Figure 2:
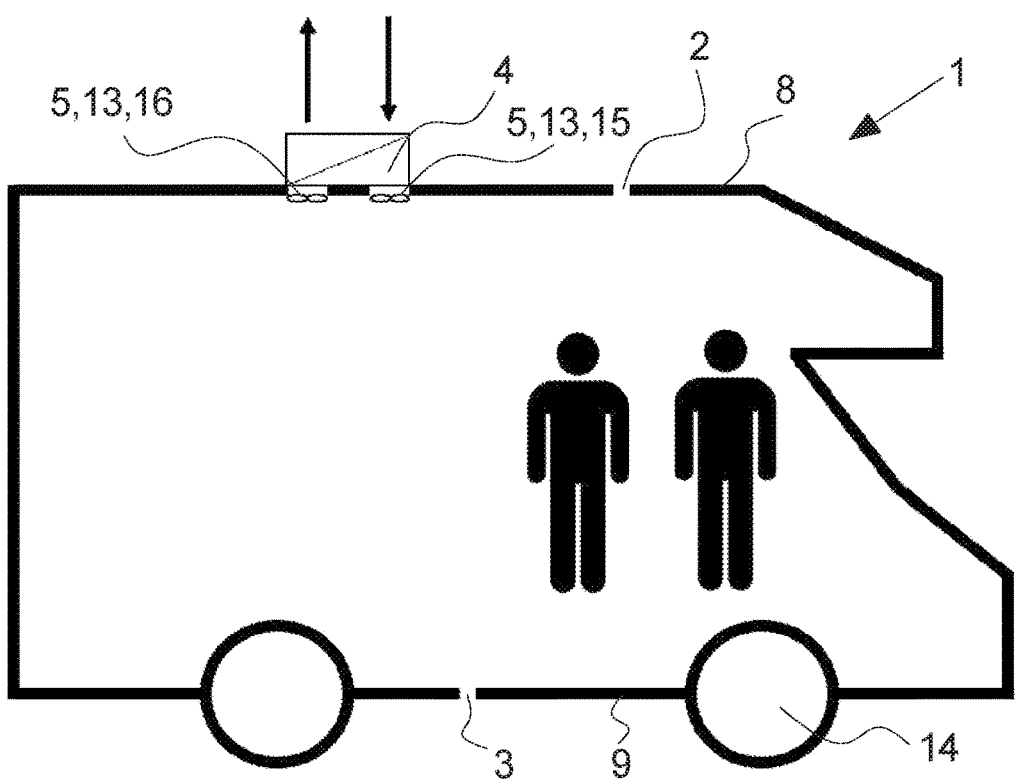
Figure 3:
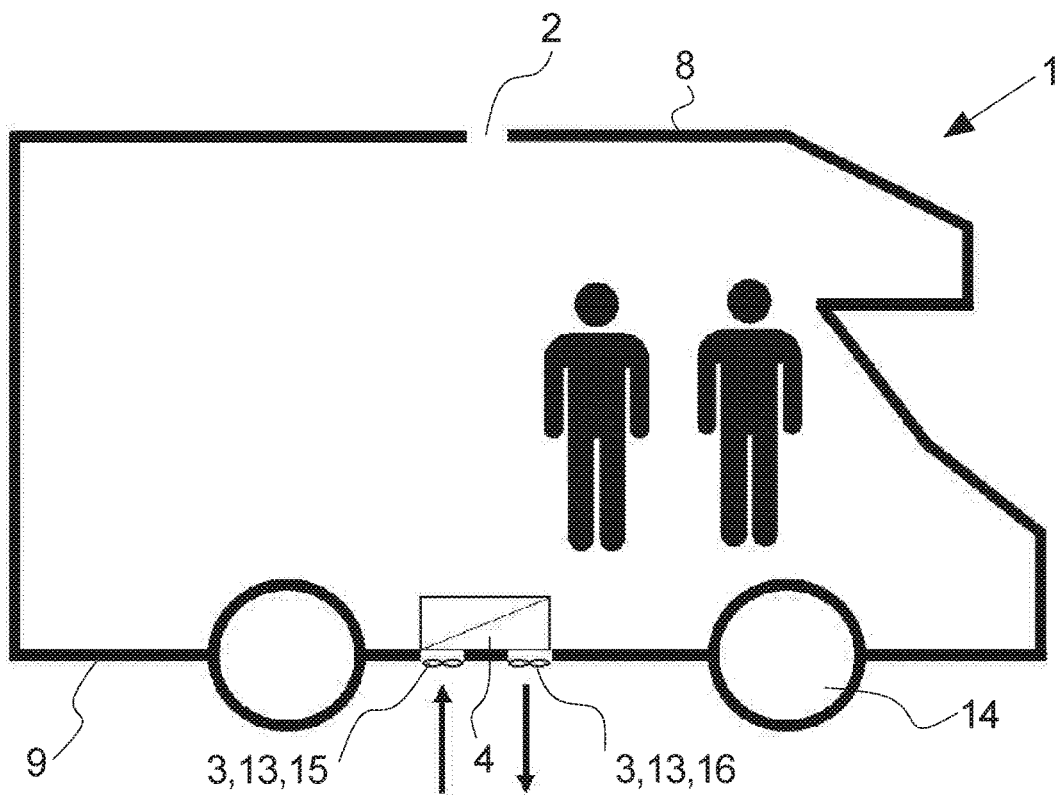
Figure 4:
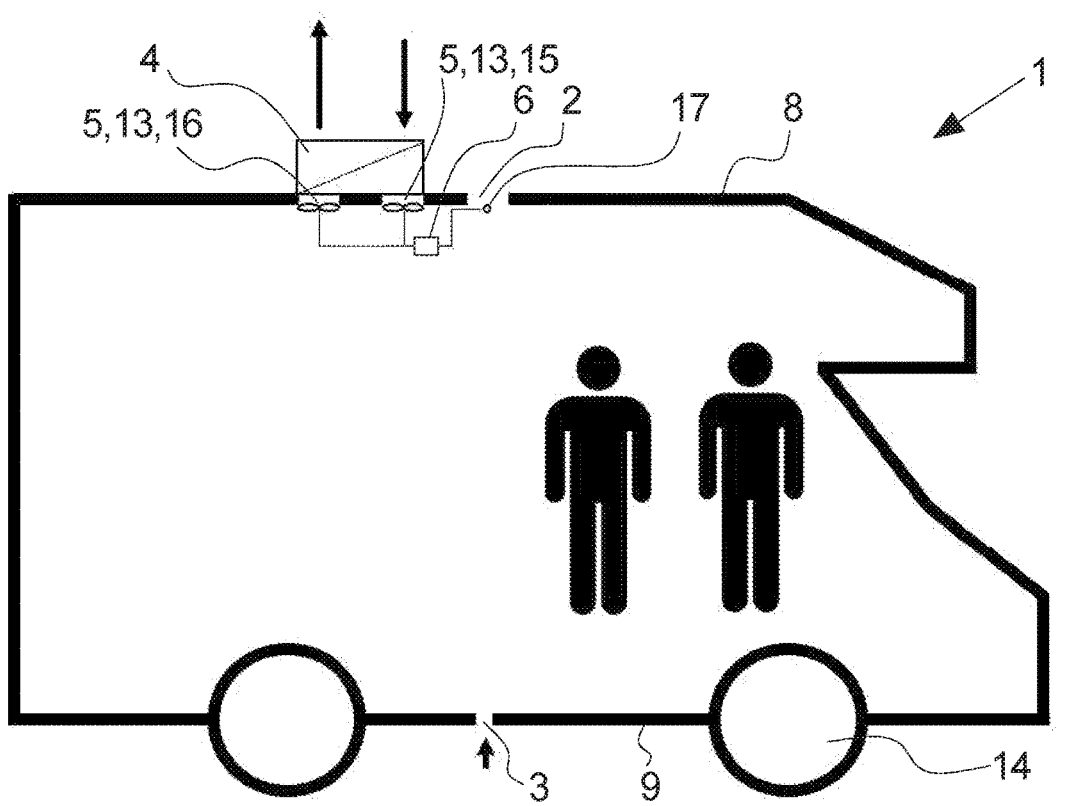
Figure 5:
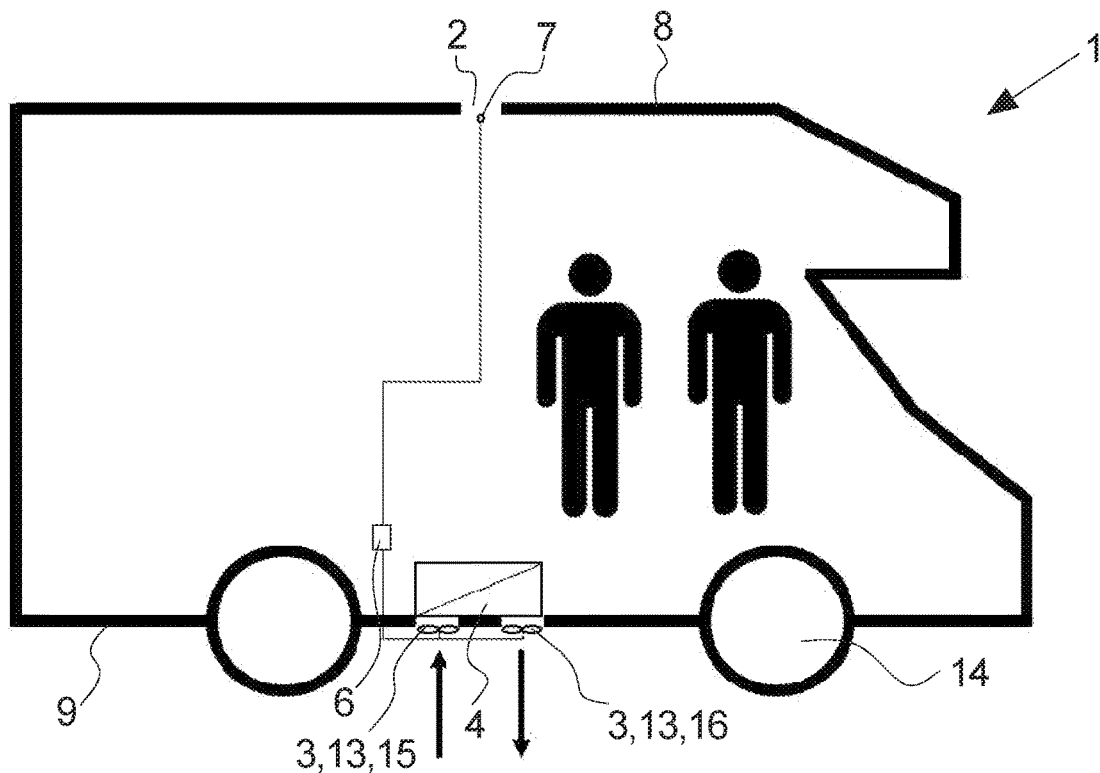
Figure 6:
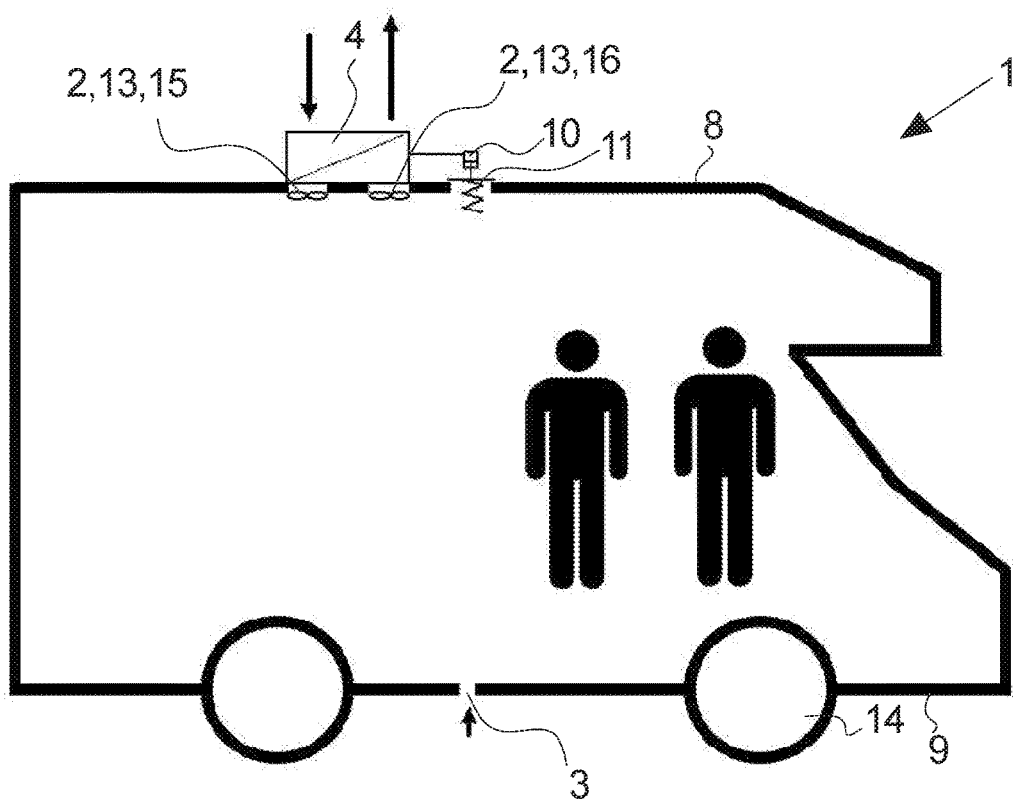
Figure 7:
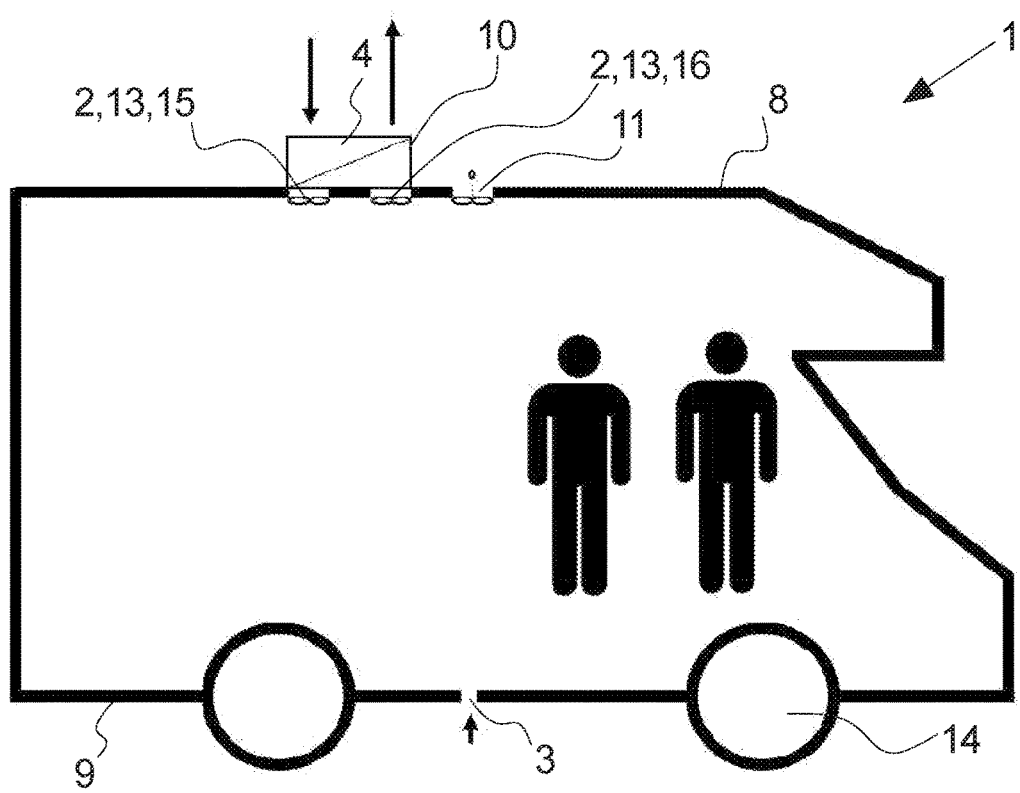
Figure 8:
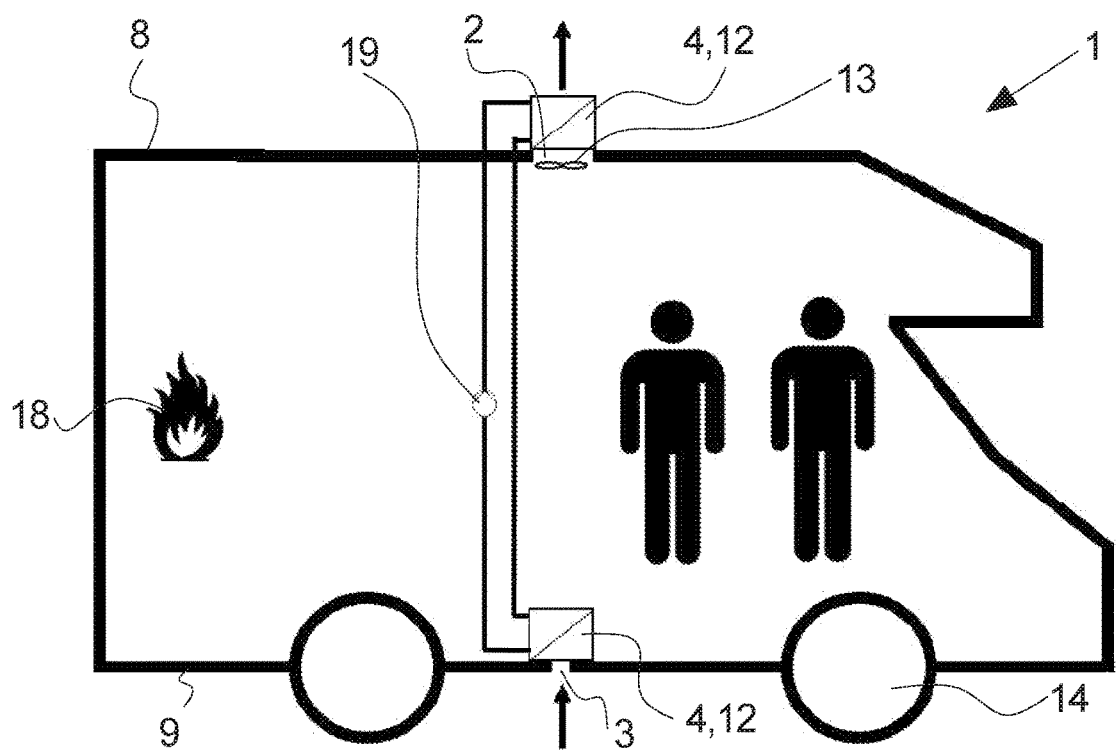
Figure 9:
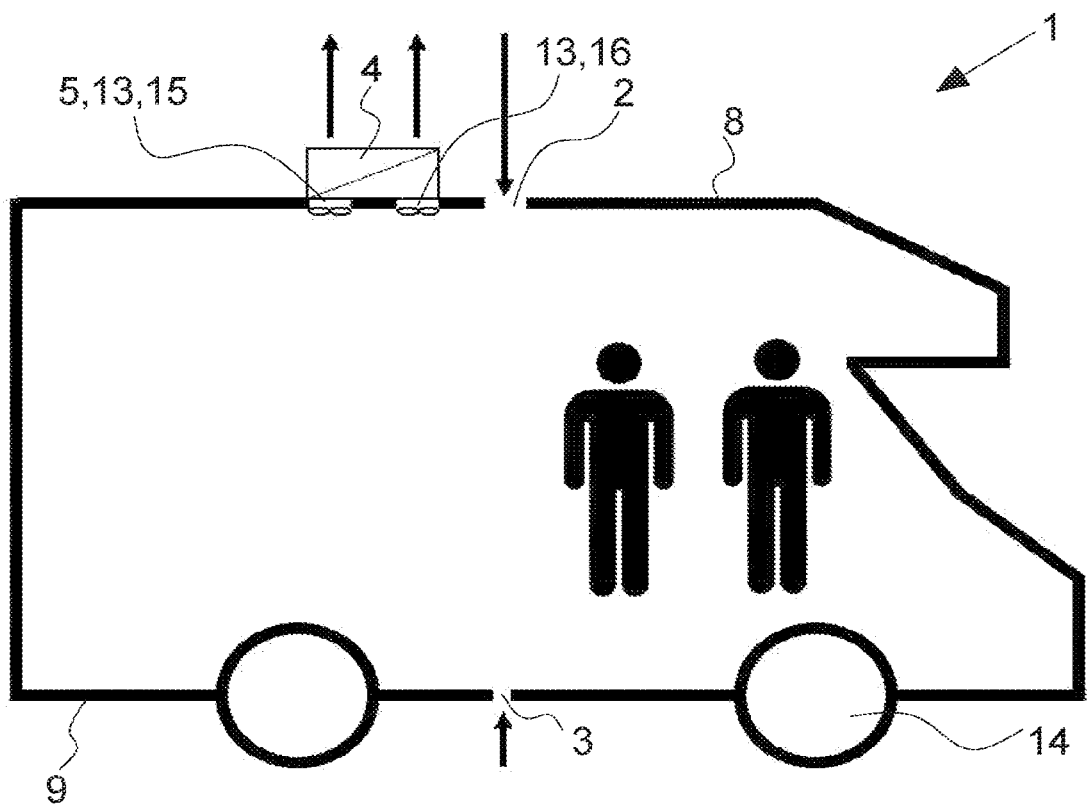
Figure 10:
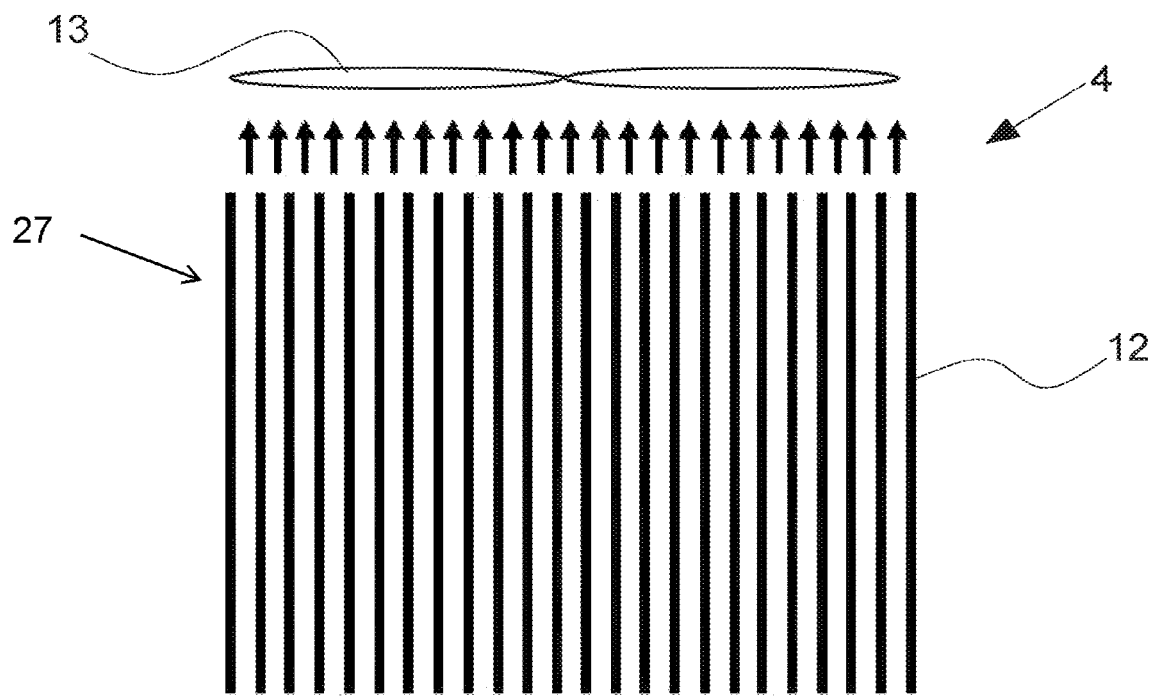

The invention will be described in the following with reference to the figures in which FIG. 1 illustrates a mobile accommodation vehicle comprising heat recovery ventilation means arranged in a first free flow opening, FIG. 2 illustrates a mobile accommodation vehicle comprising a third free flow opening, FIG. 3 illustrates a mobile accommodation vehicle comprising heat recovery ventilation means arranged in a second free flow opening, FIG. 4 illustrates a mobile accommodation vehicle comprising pressure differential measuring means, FIG. 5 illustrates a mobile accommodation vehicle comprising air flow measuring means, FIG. 6 illustrates a mobile accommodation vehicle comprising a first embodiment of an emergency air flow device, FIG. 7 illustrates a mobile accommodation vehicle comprising a second embodiment of an emergency air flow device, FIG. 8 illustrates a mobile accommodation vehicle comprising heat recovery ventilation means arranged at both the first and the second free flow opening, FIG. 9 illustrates a mobile accommodation vehicle where the heat recovery ventilation means increase ventilation, and FIG. 10 illustrates an embodiment of heat recovery ventilation means.

DETAILED DESCRIPTION OF THE INVENTION

FIG. 1 illustrates a mobile accommodation vehicle 1 comprising heat recovery ventilation means 4 arranged in a first free flow opening 2.

In this embodiment, the mobile accommodation vehicle 1 comprises a first free flow opening 2 arranged in the roof surface 8 of the vehicle 1 and a second free flow opening 3 arranged in the floor surface 9 of the vehicle 1 to space the openings 2,3 vertically far apart, so that the first free flow opening 2 is placed considerably higher than the second free flow opening 3. However, in another embodiment the first free flow opening 2, the second free flow opening 3 and/or other openings could be located in walls of the vehicle 1.

In this embodiment, the first free flow opening 2 is provided with heat recovery ventilation means 4 which in this embodiment is a regenerator including an air flow generator 13 comprising a separate inflow generator 15 and a separate outflow generator 16. However, in another embodiment heat recovery ventilation means 4 could be of another type as will be discussed later and/or the heat recovery ventilation means 4 could comprise more air flow generators 13 or the heat recovery ventilation means 4 could comprise a single air flow generator 13 arranged to alternately generate the inflow and the outflow as will be discussed in relation to FIG. 10.

In this embodiment, the heat recovery ventilation means 4 is designed so that when the heat recovery ventilation means 4 is not in operation, air may flow freely between the inside and the outside of the vehicle 1 through the heat recovery ventilation means 4. Thus, even if the heat recovery ventilation means 4 is malfunctioning or not working at all, an air flow can always be generated through the first free flow opening 2 and the second free flow opening 3.

In this embodiment, the heat recovery ventilation means 4 is controlled so that the inflow through the heat recovery ventilation means 4 is substantially equal to the outflow through the heat recovery ventilation means 4. Thereby the inflow and/or the outflow through the second free flow opening 3 will be reduced in most cases.

In another embodiment, the heat recovery ventilation means 4 could further comprises sensors or other similar means for monitoring the quality of the air inside the mobile accommodation vehicle 1 and then also control the operation of the heat recovery ventilation means 4 in response to this monitoring.

FIG. 2 illustrates a mobile accommodation vehicle 1 comprising a third free flow opening 5.

In this embodiment, the heat recovery ventilation means 4 is designed so that when the heat recovery ventilation means 4 is not in operation, the passage through the heat recovery ventilation means 4 is blocked or at least severely reduced. Thus, to ensure that an air flow can always be generated through two vertically separated free flow openings 2, 3, the heat recovery ventilation means 4 is in this embodiment provided with a third free flow opening 5 in which the heat recovery ventilation means 4 is installed.

FIG. 3 illustrates a mobile accommodation vehicle 1 comprising heat recovery ventilation means 4 arranged in a second free flow opening 3.

This solution is similar to the solution displayed in FIG. 1 but in this embodiment, the heat recovery ventilation means 4 is placed in the second free flow opening 3. The legal requirements to the size of the openings usually dictates that the second free flow opening 3 can be formed considerably smaller than the first free flow opening 2. Thus, by fitting the heat recovery ventilation means 4 in the second free flow opening 3 the heat recovery ventilation means 4 can be formed much more compact.

FIG. 4 illustrates a mobile accommodation vehicle 1 comprising pressure differential measuring means 17.

In this embodiment, the mobile accommodation vehicle 1 comprise pressure differential measuring means 17 for measuring a pressure differential between the inside and the outside of the mobile accommodation vehicle 1 at the first free flow opening 2. However, in another embodiment the pressure differential could also or instead be measured at the second free flow opening 3, the third free flow opening 5 and/or another opening in the vehicle 1.

In this embodiment, the mobile accommodation vehicle 1 also comprises control means 6 arranged to control the operation of the heat recovery ventilation means 4 in response to the measurements of the pressure differential measuring means 17 so that the heat recovery ventilation means 4 will attempt to maintain the pressure inside the mobile accommodation vehicle 1 substantially equal to the pressure outside the mobile accommodation vehicle 1 at the first free flow opening 2, so that air flow through the first free flow opening 2 hereby is avoided or at least reduced.

In this embodiment both the pressure differential measuring means 17 and the control means 6 are formed as parts of the heat recovery ventilation means 4 but in another embodiment, the pressure differential measuring means 17 and/or the control means 6 could be formed separate from the heat recovery ventilation means 4 e.g. as part of the control means of the vehicle 1 and only a control signal would be communicated to the heat recovery ventilation means 4.

FIG. 5 illustrates a mobile accommodation vehicle 1 comprising air flow measuring means 7.

In this embodiment, the vehicle 1 is provided with a second free flow opening 3 in which the heat recovery ventilation means 4 is placed and a first free flow opening 2 in which air flow measuring means 7 is located for measuring the inflow and the outflow through the first free flow opening 2. However, in another embodiment the air flow measuring means 7 could also or instead be placed in the second free flow opening 3, a third free flow opening 5 and/or another opening in the vehicle 1.

In this embodiment, the mobile accommodation vehicle 1 also comprises control means 6 arranged to control the operation of the heat recovery ventilation means 4 in response to the measuring's of the air flow measuring means 7 so that the heat recovery ventilation means 4 will attempt to reduce the air flow through the first free flow opening 2.

In this embodiment both the air flow measuring means 7 and the control means 6 are formed as parts of the heat recovery ventilation means 4 but in another embodiment, the air flow measuring means 7 and/or the control means 6 could be formed separate from the heat recovery ventilation means 4 e.g. as part of the control means of the vehicle 1 and only a control signal would be communicated to the heat recovery ventilation means 4.

In another embodiment, the mobile accommodation vehicle 1 disclosed in FIG. 4 could instead comprise air flow measuring means 7, the embodiment disclosed in FIG. 5 could instead comprise pressure differential measuring means 17 or the mobile accommodation vehicle 1 could comprise both pressure differential measuring means 17 and air flow measuring means 7 arranged at the same opening 2, 3, 5 or at different openings 2, 3, 5 in the vehicle. And/or the mobile accommodation vehicle 1 could also or instead comprise other sensor for measuring oxygen level inside the vehicle, CO2 level inside the vehicle, temperature level inside and/or outside the vehicle, humidity level inside the vehicle and/or other and the control means 6 would be arranged to also control the operation of the heat recovery ventilation means 4 in response to measurements from these additional sensors.

The air flow through an opening 2, 3, 5 can be measured in several ways by means of known anemometers or more indirectly by means of detecting a pressure difference across an opening 2, 3, 5, a temperature difference across an opening 2, 3, 5 and in a preferred embodiment of the invention the air flow in and/or out through the heat recovery ventilation means 4 is controlled on the basis of these measurements, predictions, deductions or calculations regarding the airflow in and/or out of the first free flow opening 2, the second free flow opening 3, a third free flow opening 5 and/or the heat recovery ventilation means 4.

FIG. 6 illustrates a mobile accommodation vehicle 1 comprising a first embodiment of an emergency air flow device 10 and FIG. 7 illustrates a mobile accommodation vehicle 1 comprising a second embodiment of an emergency air flow device 10.

In this embodiment, the passage through the heat recovery ventilation means 4 will be blocked or substantially reduced if the heat recovery ventilation means 4 is malfunctioning or out of operation and in this embodiment, the heat recovery ventilation means 4 therefore comprises an emergency air flow device 10 arranged to enable free flow through an emergency free flow opening 11 when the heat recovery ventilation means 4 is malfunctioning or out of operation so that ensure that an air flow can always be generated through two vertically separated free flow openings 2, 3, 5, 11.

However, in another embodiment the emergency air flow device 10 could be arranged at another opening in the vehicle 1—such as the first free flow opening 2, the second free flow opening 3, a third free flow opening 5 and/or another opening in the vehicle 1.

In this embodiment, the emergency air flow device 10 is formed as an integrated part of the heat recovery ventilation means 4 but in another embodiment, the emergency air flow device 10 could be formed separate from the heat recovery ventilation means 4.

In the embodiment disclosed in FIG. 6 the emergency air flow device 10 is formed as a normally-open spring loaded valve so that if the power is cut off the valve will open and allow free air flow passage through the emergency free flow opening 11 and in FIG. 7 the emergency air flow device 10 is formed as a fan arranged to counter balance the natural air flow in or out of the opening 11—generated by convection and/or other—so that if the power is cut off the fan will stop and allow a free air flow passage through the emergency free flow opening 11. However, in another embodiment the emergency air flow device 10 could be formed in several other ways.

FIG. 8 illustrates a mobile accommodation vehicle 1 comprising heat recovery ventilation means 4 arranged at both the first 2 and the second free flow opening 3.

In this embodiment, the heat recovery ventilation means 4 are formed as an air-to-liquid heat exchanger arranged in the first free flow opening 2 arranged to exchange heat with another air-to-liquid heat exchanger arranged in the second free flow opening 3 by means of a coolant being circulated by a pump 19. In this embodiment, only the heat exchanger arranged in the first free flow opening 2 is provided with an air flow generator 13 but in another embodiment, an air flow generator 13 could be arranged at both openings 2, 3.

In another embodiment, both the first free flow opening 2 and the second free flow opening 3 could be provided with heat recovery ventilation means 4 of the regenerator type configured so that they would operate synchronously—i.e. so that when one is creating an inflow, the other is creating an outflow. In such a setup, the heat recovery ventilation means 4 at one opening 2, 3 could also be controlled based on knowledge about the air flow through the other heat recovery ventilation means 4 in the other opening 2, 3. Hereby it would be possible to implement control strategies which can maximise the use of ambient energy with an effective balance between the use of automatic and manual control. E.g. is a user manually increases the air flow through a heat recovery ventilation means 4 e.g. arranged in a bathroom of the vehicle 1, then other heat recovery ventilation means 4 can adapt and compensate the ventilation levels elsewhere.

In this embodiment, the mobile accommodation vehicle 1 is also provided with a heat source 18 in the form of an open flame heater. However, in another embodiment the heat source 18 could also or instead comprise a gas stove, candles or other heat sources comprising an open flame that will affect the CO2 level inside the vehicle.

FIG. 9 illustrates a mobile accommodation vehicle 1 where the heat recovery ventilation means 4 increase ventilation.

In this embodiment the first free flow opening 2 could e.g. be arranged in a bathroom of the vehicle and a user could then manually operate the heat recovery ventilation means 4 so that both the inflow generator 15 and the outflow generator 16 are arranged to generate an outflow—at least temporary—and thereby generate a significant air flow in through the second free flow opening 3 and/or the first air flow opening 2 and out through the heat recovery ventilation means 4 in free flow opening 5. In another embodiment, the heat recovery ventilation means 4 could be arranged to at least temporary generate a significant inflow instead.

FIG. 10 illustrates an embodiment of heat recovery ventilation means 4.

In this embodiment of the invention the heat recovery ventilation means 4 is a regenerator comprising an air flow generator 13—in form of a single fan—and a heat exchange unit 12 in the form of a latent heat storage.

In this embodiment, the heat energy conservation is made as the direction of the flow through the regenerator 27 alternates—by alternating the rotational direction of the air flow generator 13—so that the air heat energy from one direction is transferred to the heat exchange unit 12 and then to air flow in the opposite direction when the air flow generator 13 changed flow direction. In another embodiment, the heat recovery ventilation means 4 could be provided with a separate inflow generator and a separate outflow generator arranged to operate more or less independently or the heat recovery ventilation means 4 could be designed in numerous other ways.

In this embodiment, the ratio of heat exchange can be controlled by controlling the quantity of inflow and/or outflow in each ventilation cycle. The quantity can be controlled by changing the duration of the cycle time and/or by changing the air flow rate through the heat recovery ventilation means 4.

In another embodiment, the heat recovery ventilation means 4 could also be provided provided with filters to reduce dirt deposits on the internal components of the heat recovery ventilation means 4 and to improve inside air quality.

The invention has been exemplified above with reference to specific examples of mobile accommodation vehicles 1, heat recovery ventilation means 4, air flow measuring means 7 and other. However, it should be understood that the invention is not limited to the particular examples described above but may be designed and altered in a multitude of varieties within the scope of the invention as specified in the claims.

LIST

1. Mobile accommodation vehicle
2. First free flow opening
3. Second free flow opening
4. Heat recovery ventilation means
5. Third free flow opening
6. Control means
7. Air flow measuring means
8. Roof surface of said mobile accommodation vehicle
9. Floor surface of said mobile accommodation vehicle
10. Emergency air flow device
11. Emergency free flow opening
12. Heat exchange unit
13. Air flow generator
14. Wheel
15. Inflow generator
16. Outflow generator
17. Pressure differential measuring means
18. Heat source
19. Pump

The invention claimed is:

1. A mobile accommodation vehicle comprising:
a first free flow opening enabling free air flow between an inside and an outside of said mobile accommodation vehicle,
a second free flow opening also enabling free air flow between the inside and the outside of said mobile accommodation vehicle, said second free flow opening located in or at a floor of said mobile accommodation vehicle and allowing air flow if air flow passage through a heat recovery ventilator is blocked or at least reduced, said second free flow opening spaced vertically apart from said first free flow opening, such that said first free flow opening is arranged higher than said second free flow opening in said mobile accommodation vehicle,
a third free flow opening, said third free flow opening spaced vertically apart from said second free flow opening, such that said third free flow opening and said first free flow opening are arranged higher than said second free flow opening and spaced vertically apart from said second free flow opening,
wherein said first free flow opening and said third free flow opening are provided with said heat recovery ventilator, and wherein said heat recovery ventilator provides a first fan for a first air flow in a first direction and a second fan for a second air flow in a second direction, and additionally allows said free air flow there through into and out of said mobile accommodation vehicle when said heat recovery ventilator is not operating, and wherein said heat recovery ventilator comprises a heat exchanger which exchanges heat between an inbound and outbound air flow moving therein,
wherein said mobile accommodation vehicle comprises a controller arranged to control said heat recovery ventilator, and
wherein said mobile accommodation vehicle comprises an air flow measuring sensor for measuring the inbound air flow and the outbound air flow through at least one of said first free flow opening, said second free flow opening, or said third free flow opening and/or a pressure differential measuring sensor for measuring a pressure differential between said inside and said outside of said mobile accommodation vehicle, said air flow measuring sensor providing measurements to said controller;
wherein said controller controls said air flow through said heat recovery ventilator based upon said measurements of said air flow measuring sensor and/or said pressure differential measuring sensor.

2. The mobile accommodation vehicle according to claim 1, wherein said controller is arranged to generate a balanced air flow through said heat recovery ventilator enabling that when said heat recovery ventilator is in operation, the inbound air flow through said heat recovery ventilator will be equal to the outbound air flow through said heat recovery ventilator.

3. The mobile accommodation vehicle according to claim 1, wherein said controller is arranged to control said heat recovery ventilator to reduce the free air flow through at least one of said first free flow opening or said third free flow opening.

4. The mobile accommodation vehicle according to claim 1, wherein said heat recovery ventilator includes a first heat recovery ventilator arranged at said first free flow opening and a second heat recovery ventilator arranged at said third free flow opening.

5. The mobile accommodation vehicle according to claim 1, wherein said first free flow opening is arranged in a roof surface of said mobile accommodation vehicle and/or wherein said second free flow opening is arranged in a floor surface of said mobile accommodation vehicle.

6. The mobile accommodation vehicle according to claim 1, wherein said heat recovery ventilator comprises an emergency air flow valve arranged to enable said free air flow through an emergency free flow opening if said heat recovery ventilator is malfunctioning or out of operation.

7. The mobile accommodation vehicle according to claim 1, wherein said controller is arranged to control operation of said heat recovery ventilator so that pressure inside said mobile accommodation vehicle is equal to pressure outside said mobile accommodation vehicle.

8. A method for ventilating a mobile accommodation vehicle, comprising:
a first free flow opening capable of enabling free air flow between an inside and an outside of said mobile accommodation vehicle, a second free flow opening also capable of enabling free air flow between the inside and the outside of said mobile accommodation vehicle, said second free flow opening located in or at a floor of said mobile accommodation vehicle and spaced vertically apart from said first free flow opening, such that said first free flow opening is arranged higher than said second free flow opening in said mobile accommodation vehicle, wherein said first free flow opening or said second free flow opening comprises a heat recovery ventilator, said heat recovery ventilator having a first fan providing an inbound air flow and a second fan providing an outbound air flow, and wherein said heat recovery ventilator comprises a heat exchanger which exchanges heat between the inbound air flow and the outbound air flow moving therethrough, wherein said heat recovery ventilator allows said free air flow there through into and out of said mobile accommodation vehicle including when said heat recovery ventilator is not operating, the second free flow opening or a third free flow opening which allows air flow if passage through said heat recovery ventilator is blocked or at least reduced when said heat recovery ventilator is not in operation, said third free flow opening spaced vertically apart from said first free flow opening or said second free flow opening;

wherein said heat recovery ventilator is controlled to reduce the free air flow through at least one of said first free flow opening, said second free flow opening, or said third free flow opening, and wherein said method comprises the steps of:

directly or indirectly obtaining measurements regarding the air flow in and/or out of said first free flow opening, said second free flow opening, said third free flow opening and/or said heat recovery ventilator, and controlling said outbound air flow out through said heat recovery ventilator and/or said inbound air flow in through said heat recovery ventilator based on said measurements.

9. The method according to claim 8, wherein said heat recovery ventilator is controlled so that said inbound air flow through said heat recovery ventilator is equal to said outbound air flow through said heat recovery ventilator.

10. The method according to claim 8, wherein said heat recovery ventilator is controlled so that pressure inside said mobile accommodation vehicle is equal to pressure outside said mobile accommodation vehicle.

11. The method according to claim 8, wherein said method further comprises monitoring quality of air inside said mobile accommodation vehicle and controlling the operation of said heat recovery ventilator in response to said monitoring.

12. The method for ventilating a mobile accommodation vehicle according to claim 8, wherein said heat recovery ventilator is arranged at both said first free flow opening and said third free flow opening.

\* \* \* \* \*